June 5, 1934.   E. K. LE FEVRE   1,961,671
PITCH ANGLE CONTROL MECHANISM FOR AIRCRAFT PROPELLERS
Filed April 1, 1932   8 Sheets-Sheet 1

Inventor
EDWIN K. LE FEVRE
By Herbert L. Davis
Attorney

June 5, 1934.   E. K. LE FEVRE   1,961,671
PITCH ANGLE CONTROL MECHANISM FOR AIRCRAFT PROPELLERS
Filed April 1, 1932   8 Sheets-Sheet 2
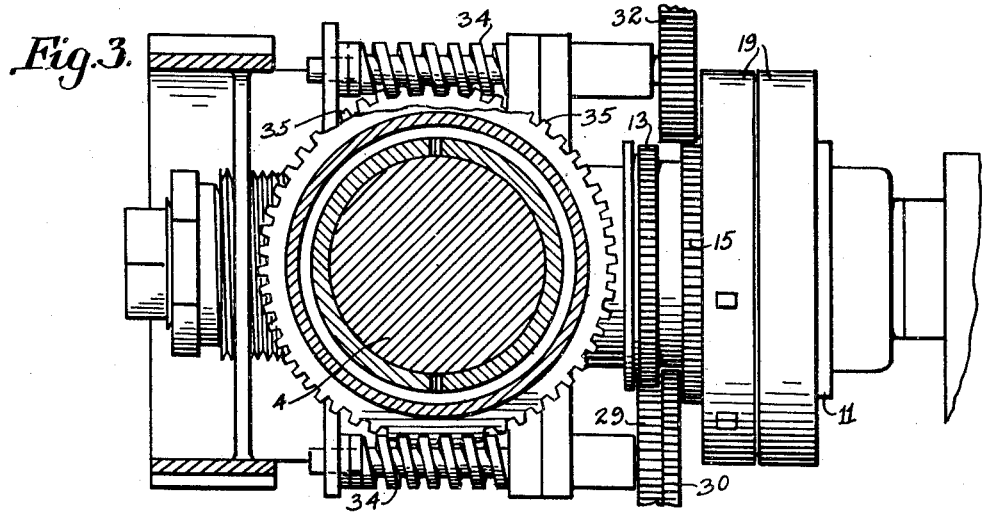
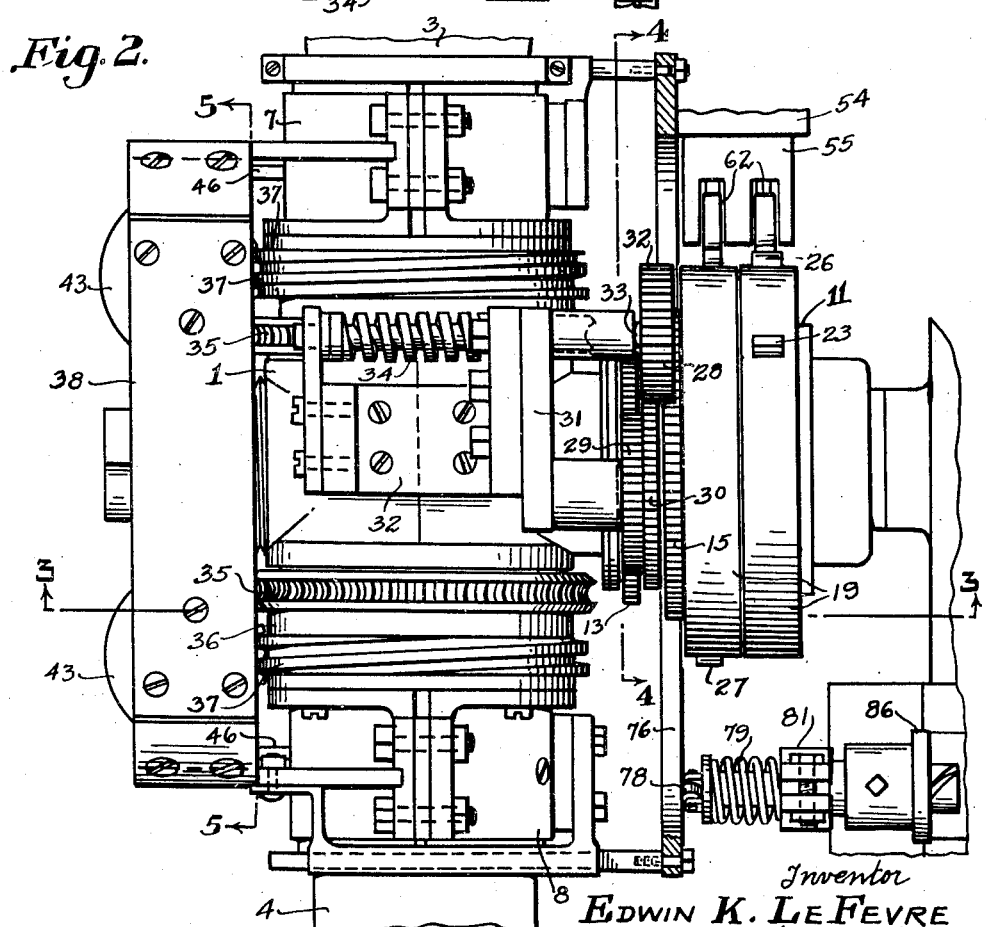
Inventor
EDWIN K. LeFEVRE
By Herbert L. Davis
Attorney June 5, 1934. E. K. LE FEVRE 1,961,671
PITCH ANGLE CONTROL MECHANISM FOR AIRCRAFT PROPELLERS
Filed April 1, 1932  8 Sheets-Sheet 3

Inventor
EDWIN K. LE FEVRE
By Herbert L. Davis
Attorneys

June 5, 1934.   E. K. LE FEVRE   1,961,671
PITCH ANGLE CONTROL MECHANISM FOR AIRCRAFT PROPELLERS
Filed April 1, 1932   8 Sheets-Sheet 4

Inventor
EDWIN K. LE FEVRE
By Herbert L. Davis
Attorney

June 5, 1934.  E. K. LE FEVRE  1,961,671
PITCH ANGLE CONTROL MECHANISM FOR AIRCRAFT PROPELLERS
Filed April 1, 1932  8 Sheets-Sheet 6

Inventor
EDWIN K. LE FEVRE
By Herbert L. Davis
Attorney

June 5, 1934.  E. K. LE FEVRE  1,961,671
PITCH ANGLE CONTROL MECHANISM FOR AIRCRAFT PROPELLERS
Filed April 1, 1932  8 Sheets-Sheet 7

Inventor
EDWIN K. LEFEVRE
By Herbert L. Davis
Attorneys

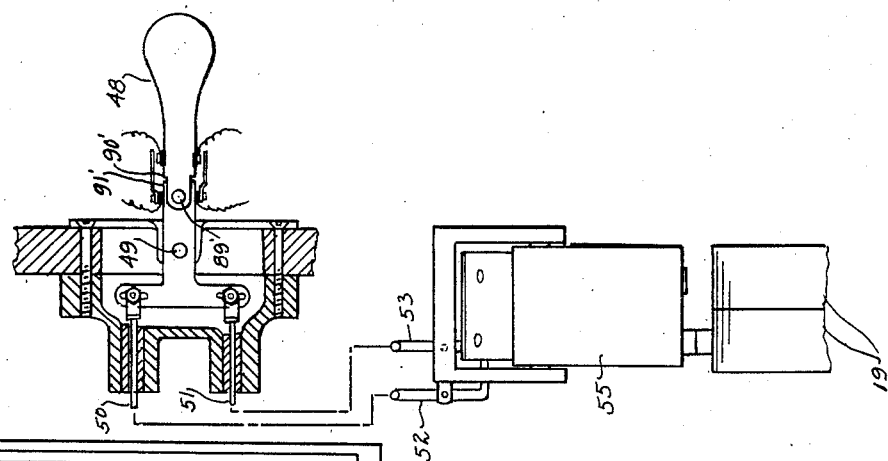
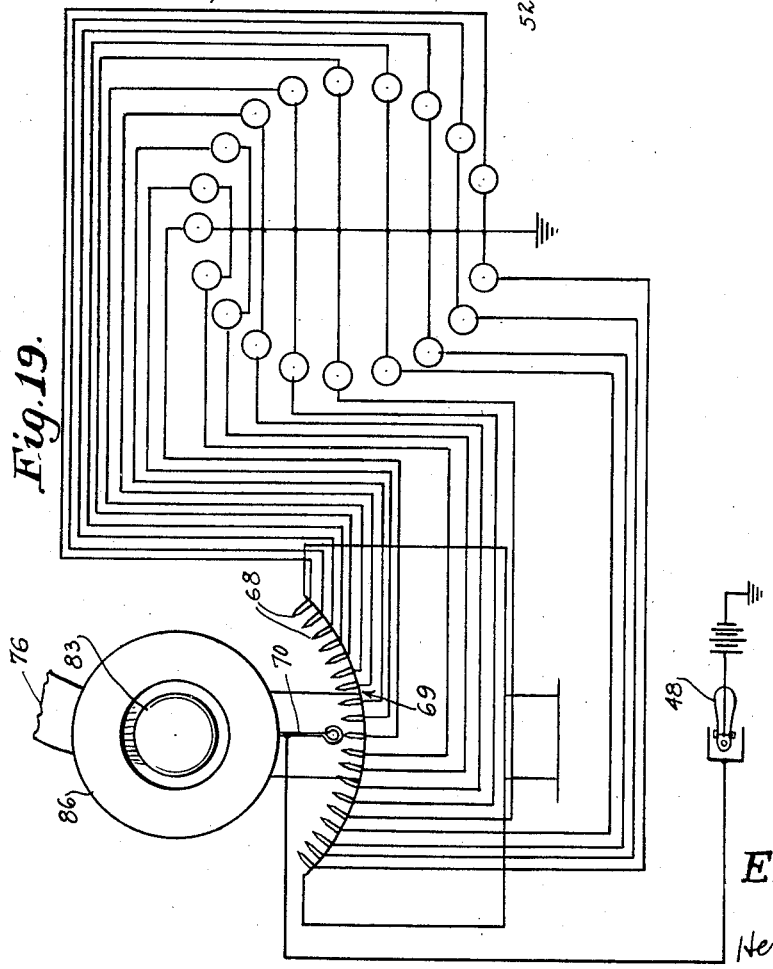

Patented June 5, 1934

1,961,671

UNITED STATES PATENT OFFICE 1,961,671

PITCH ANGLE CONTROL MECHANISM FOR AIRCRAFT PROPELLERS

Edwin K. Le Fevre, Chevy Chase, Md., assignor to Whitfield Engineering Company, Washington, D. C.

Application April 1, 1932, Serial No. 602,556

12 Claims. (Cl. 170—163)

This invention relates to a pilot controlled system for changing the pitch-angle of propellers in air craft, and especially designed for varying the pitch-angle while the ship is in flight.

It is of course, an elemental principle applicable to propellers generally, whether referred to aerial or marine use, that within limits, increased pitch results in propulsive efficiency of the propeller, but at the same time imposes a greater load upon the prime mover, slowing it and reducing its power, resulting in, at the optimum pitch-angle, a compromise of the efficiency factors of both the propeller and engine.

The present invention concerns itself with apparatus for adjustably varying the propeller pitch-angle in both directions, independently of centrifugal force and without the intermediary of fluid pressure devices or an electric motor, but solely by mechanical means deriving its power from the driving torque of the engine and actuated by the pilot with finger-tip ease.

One of the objects of the present invention is to provide apparatus of the class described in which the hub is fixed to the propeller drive shaft, and the mechanism for varying the pitch-angle is carried by the hub, the elements of which mechanism remain relatively at rest at all times, except for the short intervals in which the pitch is being changed. This practically eliminates the factor of wear and also avoids the need for lubrication.

Another object of the invention is to provide planetary gearing in both direct and reverse relation, arranged in duplicate sets, one for each blade and connected to the blades by gear trains including worms, screws or the like, whereby any set position of the blade is absolutely irreversible with respect to force applied to the blades and whereby the angular displacement of the blades is absolutely synchronous, and identical in value. The direct and reverse gear trains of each set are selectively operated by the stopping of gears in mesh with said planetary gearing and normally floating with respect to the propeller drive shaft and hub, responsive to means projected obstructively into the path of one or the other of said gears through the manual touch of the pilot.

A further object of the invention is to provide indicating means for displaying in convenient proximity to the pilot the value of the pitch-angle, said means acting directly responsive to the positions of the blades themselves, and only indirectly to the mechanism by means of which the blades are turned, so that any lost motion or tolerance in the gear trains by which the blades are deflected does not affect the value of the pitch-angle indication, so that the desired pitch can always be obtained.

Still another object of the invention is the provision of actuating means which are normally altogether out of contact with any structure rotatably carried by the propeller shaft, thus avoiding wear and need of lubrication, the actuating means being selectively engageable with the pitch increasing or diminishing elements only at the time when change in the pitch-angle is to be made.

Other objects of the invention will appear as the following description of a preferred and practical embodiment thereof proceeds.

In the drawings which accompany and form a part of the following specification, and in which the same characters of reference have been employed throughout the several figures to designate identical parts:

Figure 2 is a plan view of the pitch-angle varying mechanism;

Figure 3 is a section taken along the line 3—3 of Figure 2;

Figure 19 is a front elevation partly diagramatic showing the control lever and the relation of the commutator to the indicating element; and Figure 20 is a plan view partly in section showing the relation of the control means to the drums which are directly concerned with the selective actuation of the pitch-angle varying mechanism.

Figure 6:
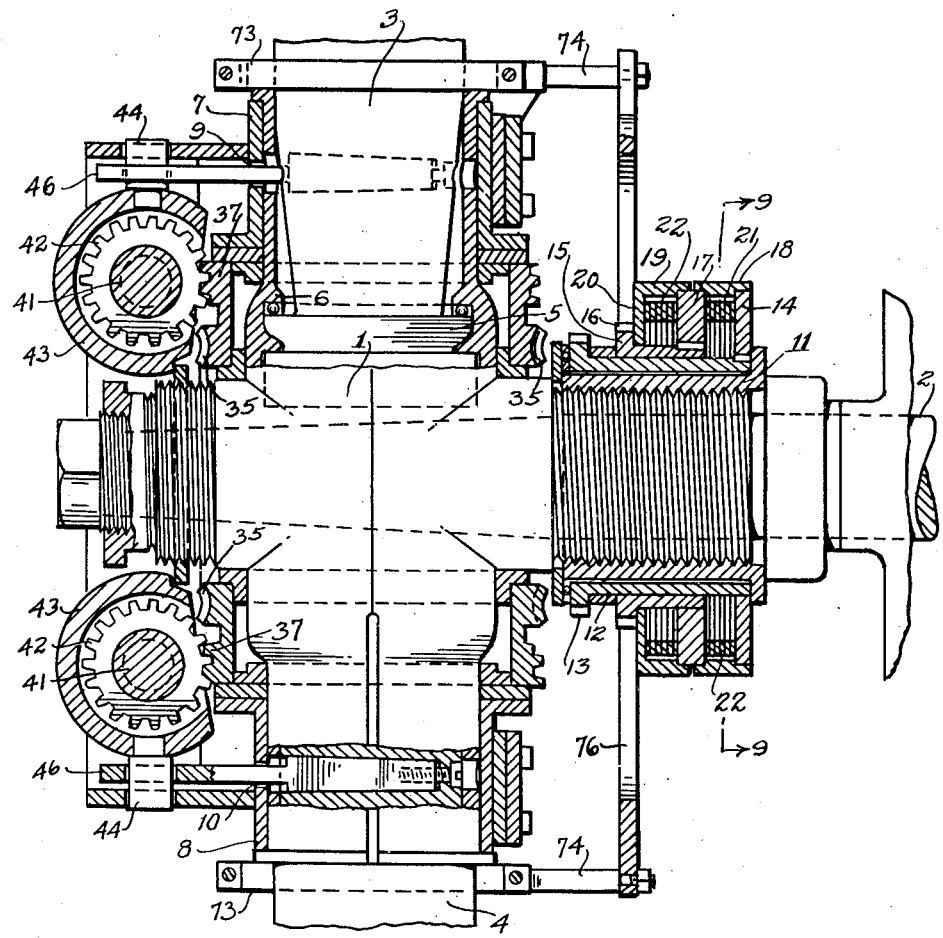
Figure 6 is a horizontal section taken just above the plane of the hub, parts being removed.
Figure 7:
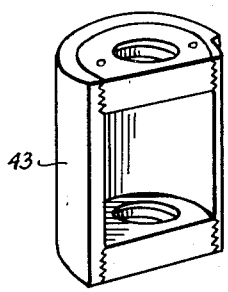
Figure 7 is a perspective view of one of the reciprocating nuts.
Figure 8:
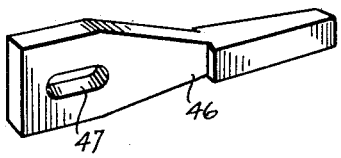
Figure 8 is a perspective view of the connecting lever which directly actuates the propeller blades.

Referring now in detail to the several figures, and adverting for the moment, to Figure 6, the numeral 1 represents the hub of a propeller suitably keyed to the propeller shaft 2 by conventional means which it has not been thought necessary to illustrate. The propeller blades 3 and 4 extend from opposite ends of the hub, and are mounted for angular deflection about radial axes.

It will be understood that the drawings have been made from a full scale model of the invention, and that since the hub utilized in its construction is a standard hub for adjustable pitch blades, and that the means resorted to for mounting the several elements of the present invention on the standard hub and as shown, are merely shop expedients and do not purport to be the final design in which the construction will be built.

The propeller blades are each provided with an integral thrust collar 5 bearing against interior annular shoulders 6 which resist the centrifugal thrust of the blades. The hub extensions 7 and 8 which surround the bases of the blades are slotted as indicated at 9 and 10 for a purpose which will hereinafter appear.

The rearward end of the hub is shown as being threaded to receive a cylindrical bearing 11 on which is journalled a sleeve 12 having a gear 13 at its inner end. A flange 14 positioned perpendicular to the plane of rotation of the hub is keyed or otherwise suitably secured to the sleeve 12. If desired, the flange 14 and the sleeve 12 may be made integrally.

Journalled on the inner sleeve 12 is an outer sleeve 15 having a gear 16 at its inner end and having fixed thereto at its outer end, a flange 17 extending in a plane perpendicular to the axis of rotation of the hub. A drum band 18 rests at its lateral portions upon the flanges 14 and 17, said flanges being of the same outside diameter and the band being formed with interior lateral rabbets seating upon said flanges. A second drum band 19 is provided, resting similarly upon the peripheral surface of the flange 17 and being supported at its opposite side in any suitable manner as for instance, by the disk 20 mounted upon the outer sleeve 15.

The drum band 18 is connected to the inner sleeve 12 by a shock absorbing spring 21 and the drum band 19 is connected to the outer sleeve 15 by a similar shock absorbing spring 22. The band 19, flange 14 and the inner sleeve 12 together may be considered as a drum with a shock absorbing driving connection between its periphery and the gear 13 at its inner end, and the band 19, flange 17 and the outer sleeve 15 may likewise be considered a drum with a shock absorbing connection between its periphery and the gear 16.

Figure 9:
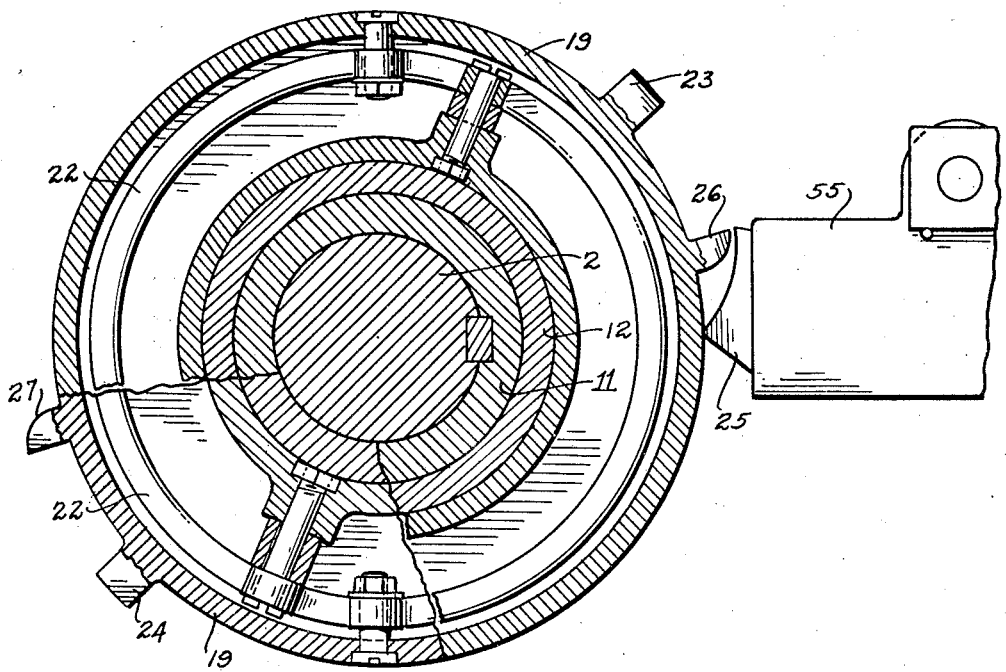
Figure 9 is a section taken along the line 9—9 of Figure 6 on an enlarged scale.

One of said drums is concerned with turning the propeller blades in one direction, while the other drum concerns itself with turning them in the opposite direction. The mechanism controlled by said drums is actuated by the selective stopping of one or the other of said drums and Figure 9 shows that the drums are provided respectively with stops 23 and 24 adapted to be engaged by detents, one of which is shown in Figure 9 and designated by the reference character 25, said detents being normally out of the path of said stops, but brought into said paths by manual means which will be described in due course, and then automatically brought into engaging position by means of lugs 26 and 27 formed on the respective drums, one of which is seen in Figure 9 in the act of turning the detent 25 so that its upper end is engaged by the stop 23 to bring the drum with which said stop is associated, to a standstill.

Figure 1:
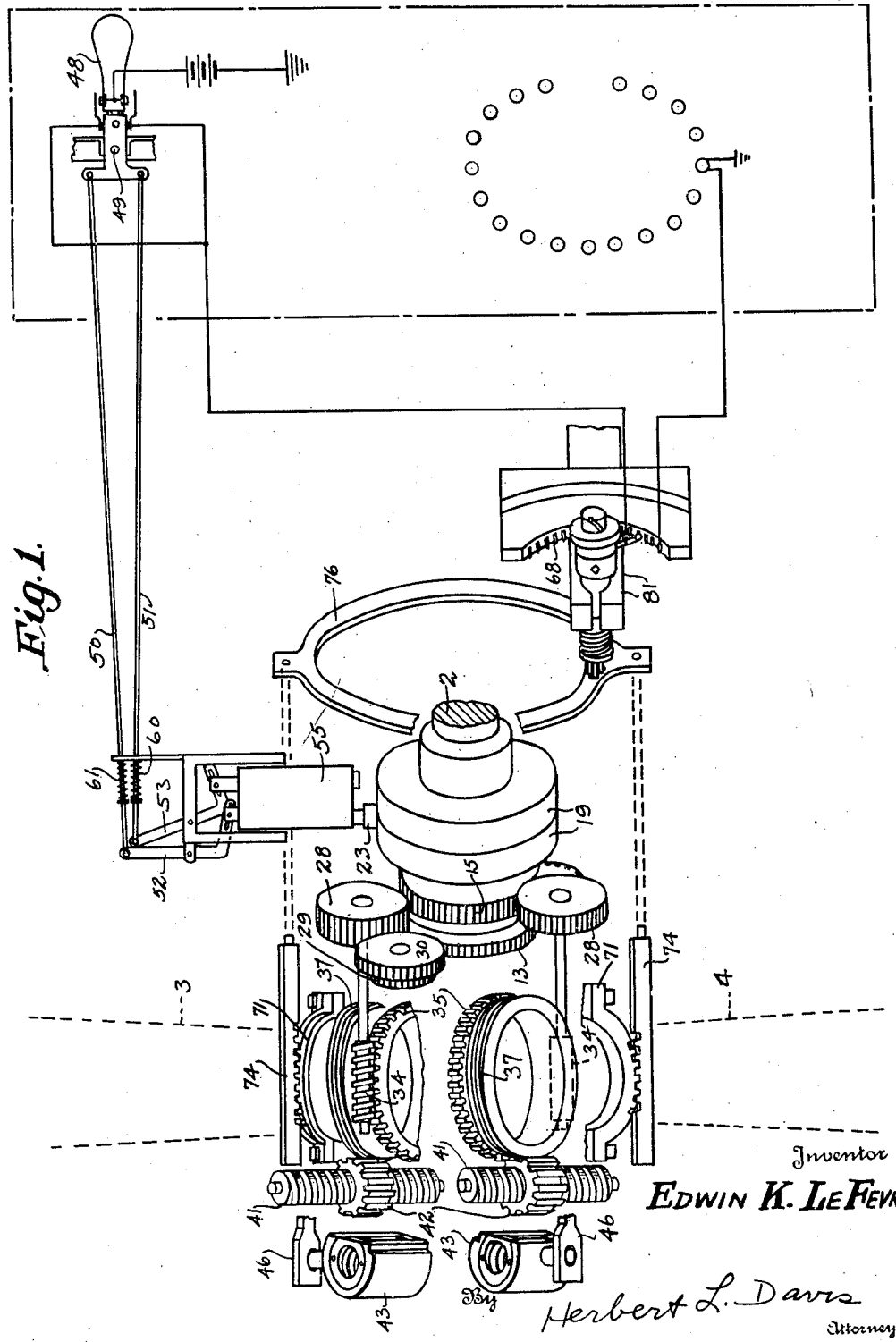
Figure 1 is a diagrammatic view illustrating the pitch-angle control system embodied in the present invention.
Figure 4:
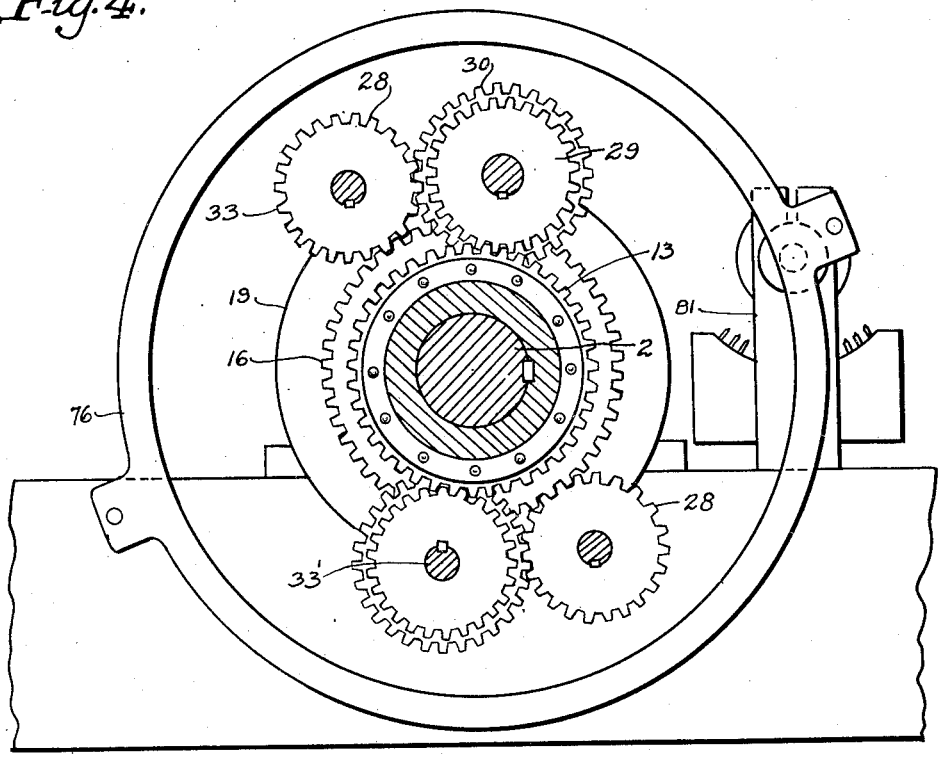
Figure 4 is a section taken along the line 4—4 of Figure 2.

Referring now to Figure 4, it will be observed that the gears 13 and 16 are in mesh with oppositely disposed pairs of gear sets, each consisting of a direct gear 28, a reverse gear 29 and an intermediate gear 30, the latter being made necessary through the fact that it is desired that the direct and reverse gears shall be the same size while the gears 16 and 13 with which they respectively mesh are of different size.

The gear 28 determines the variation of the pitch-angle in one direction, while the gear 29 determines its variation in the opposite direction. The gear 28 meshes with the gear 16 associated with the drum band 19 while the gear 13 moves with the drum band 18.

Said gear sets as will be noted from Figure 2, are supported by an upstanding frame 31 secured to a bracket 32 suitably secured to the hub of the propeller. It is obvious that normally when the propeller rotates the drums together with the drum gears 13 and 16 and the gear sets 28, 29 and 30 merely revolve with the hub of the propeller but do not interact among themlseves.

The action of the gear sets 28, 29 and 30, when the movement of one or the other of the drums is inhibited, is simple. For instance, and referring now to Figures 4, 6 and 9, supposing the plane to be in flight and the propeller together with the hub and its appurtenant parts being driven by the propeller shaft 2, and that the detent 25 is projected into the path of the stop 23 carried by the drum band 19. Rotation of this band will be stopped and after a certain amount of winding of the spring 22, the movement of the outer sleeve 15 will be inhibited, and the gear 16 come to a standstill. Since the gear sets 28, 29 and 30 are still travelling with the propeller hub, the gear 28 will then roll around the gear 16, imparting rotary movement in the opposite direction to the gear 29, but since the latter is in mesh with the gear 13 which is still rotatable, the rotation of the gear 29 will at this time have no useful result. Since the two gear sets are identical what is true at any time of one will be likewise true of the other.

Should the rotation of the drum band 18 be inhibited, the gear 13 will come to a standstill compelling the gear 29 to roll around it and imparting motion in a reverse direction to the gear 28. Thus direct and reverse movements of the gear 28 of each gear set are provided by selectively stopping the rotation of one or the other of the drum bands.

The gears 28 of each gear set will hereinafter be termed active gears, since it is through them that the power is transmitted for effecting the adjustment of the pitch-angle. The active gears 28 are fixed to shafts 33 on which as shown in Figure 2, worms 34 are mounted. Each worm meshes with a worm wheel 35 forming a part of a composite gear 36, the composite gears being journalled on the extensions 7 and 8 of the hub from which the propeller blades emanate.

The composite gears include worm portions 37.

Figure 5:
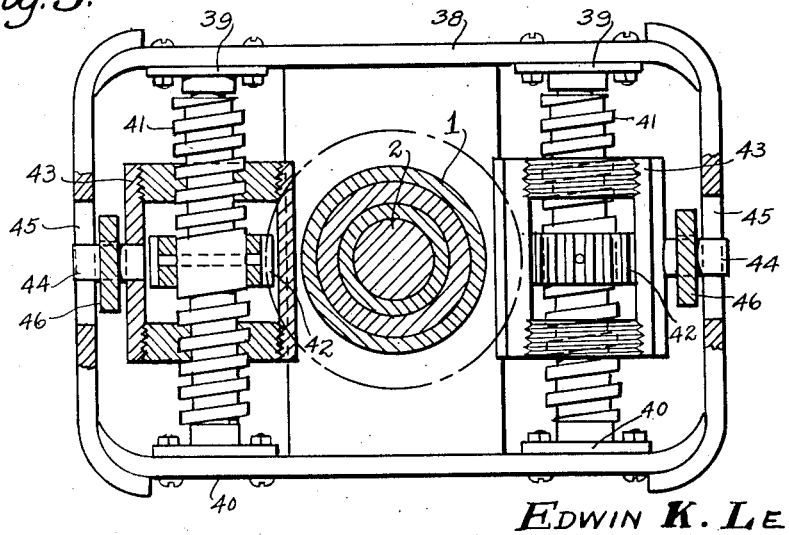
Figure 5 is a section taken along the line 5—5 of Figure 2.

A frame 38, which as Figure 5 will show, is preferably generally rectangular in cross section is bolted or otherwise rigidly secured to the hub 1. Said frame at opposite portions is provided with bearings 39 and 40, receiving revoluble screws 41. Said screws are provided intedmediately with worm gears 42 which mesh with the worm portions 37 of the composite gears and are driven thereby. Reciprocating nuts 43 are carried by said screws. Said nuts are preferably hollow or cage-shaped and encompass the worm gears 42. Each of the nuts is provided with a pin 44, said pins extending through slots 45 in said frame and which slots determine the limits of reciprocation of said nuts in either direction. The pins as will be obvious from Figure 6 extend laterally of the hub extensions 7 and 8 and substantially confronting the slots 9 and 10. Through these slots the propeller blades are accessible and each blade is provided with a lever 46 extending through the slots 9 or 10 as the case may be, and itself having a slot 47 through which the pin 44 passes. When the nut 43 reciprocates, it rocks the lever 46 and deflects the propeller blade relative to the axis of said blade.

Summarizing the operation of the apparatus insofar as it has been described, assuming that the gear 16 has been brought to a standstill, the rotation of the propeller shaft rotates the hub and with it the gear 13, transmitting rotary movement through the gear 29 to the active gear 28 to the shaft 33, the worm 34, the worm wheel portion 35 of the composite gear 36, through the worm portion of said gear to the worm gear 42, causing rotation of the screw 41 which reciprocates the nut 43, deflecting the lever 46 and changing the pitch-angle of the propeller blades. Since the movement is duplicated through both trains of mechanism, the deflection of both blades will be exactly the same and in opposite directions.

The presence of worms in the gear trains at frequent stages effects an enormous gear reduction and renders the mechanism absolutely irreversible.

This gear reduction requires a number of revolutions of the airplane propeller to effect an appreciable variation in the pitch-angle, but with the propeller running at from one to several thousand revolutions per minute, the change is effected in a few seconds.

Change in pitch-angle is accomplished by manual means operated by the pilot and preferably arranged conveniently with respect to the cockpit. Said control means comprises a hand lever 48 rockable about a fixed pivot 49 in either direction so as to selectively pull one of the wires 50 or 51, which wires extend to the vicinity of the propeller hub and through rocking levers 52 and 53 which actuate the mechanism by which the detents 25 are projected into the path of the stops 23 and 24 on the respective drums.

Figure 12:
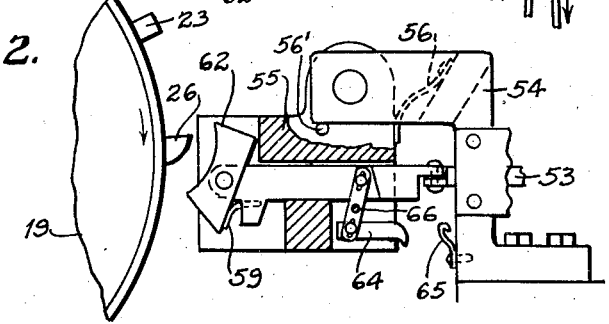
Figure 12 is a section taken along the line 12—12 of Figure 11, showing the parts in retracted position.
Figure 13:
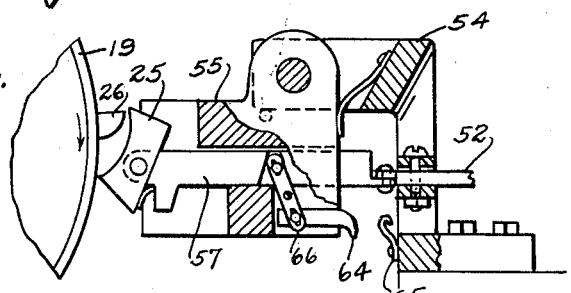
Figure 13 is a similar view to Figure 12 showing the detent projected and about to be turned into stop engaging position by the lug.

The detent mechanism comprises a fixed bracket 54 carrying a pivotally suspended block 55 normally maintained in the extended position shown in Figure 12 by means of a spring 56, the extended position of said block being determined by a stop 56' which abuts the bracket 54. Said block affords a housing for the plungers 57 and 58 to the ends of which the detents 25 are pivotally mounted. A spring 59 normally holds the detents canted as shown in Figure 12 so that the advance faces of said detents operate as cams in sliding freely upon the lugs 26 and 27 on the drum bands.

The plungers 57 and 58 are connected by lost motion connections with the rocking levers 52 and 53, being forced outwardly by said levers into the paths of the lugs 26 and 27. It will be understood that the stops 23 and 24 are travelling at propeller speed and therefore, have a great inertia. On this account, it would be impracticable to trust the projecting of the detents 25 beneath the stops to mere manual control, for it might happen that only the mere edge of the detents would engage the stops 23 resulting in chipping of the detents or the stops themselves. The purpose of the lugs 26 and 27 is to obviate this drawback. The lugs 26 and 27 are situated at such a distance in advance of the stops 23 that when they strike the cam surfaces of the detents and rock them inwardly, the detents will substantially engage the periphery of the drums before the stops 23 and 24 engage them, presenting to said stops an area of contact substantially equal to the entire lower face of said stops.

Whilesoever either of the drum bands is stopped by one of the detents, the changing of the pitch-angle goes on. When the proper pitch has been attained the handle is moved to the normal neutral position shown in full lines in Figure 10. If for any reason the pilot should let go of the hand lever 48, the detents will be immediately pulled away from the path of the stops 23 or 24 by the retrogressive action of the springs 60 and 61 which surround the wires 50 and 51 and are held compressively between collars on said wires and a fixed abutment which is here shown as part of the bracket 54.

Referring now to the series of Figures 12 to 15, inclusive, it will be noted that after the detents 25 have engaged, by one or the other of the stops 23 or 24, the rotary motion of the drum is inhibited and the pitch varying action takes place.

If, for any reason, the hand lever should be held in active position up to the limit of the pitch setting range, the ensuing immobility of the pitch-angle varying mechanism will react through the drum band, causing the stop to push down on the detent with excessive force. It should be stated in this connection that the plungers are each connected to a latch 64 slidable in the block 55 by a link 66 pivoted to said block at an intermediate point. Thus when the plunger is projected forwardly the latch extends rearwardly, and when the detent is engaged by the stop the plunger and latch are both in extended positions. The excessive force of the stop overcomes the spring 56 and the block 55 is swung down around its pivotal connection, the extended latch tripping over a spring keeper 65. This holds the block and the mechanism which it carries out of the path of the rotating drums. The result of such an emergency safety movement of the drum actuating mechanism is merely to inhibit the operation of the pitch inhibiting mechanism until the pilot again attempts to operate it.

When the pilot operates one of the wires 50 or 51 to retract the plungers 57 or 58, the retraction of the plunger simultaneously withdraws the latch from the keeper, and the block 55 flies up into its normal operative position. It will be evident that at this time the detent will be in retracted position and out of the path of revolution of the lugs and stops.

Although only one of the plungers is shown equipped with the pawl and link connections, it is obviously desirable to have both plungers so equipped.

Figure 14:
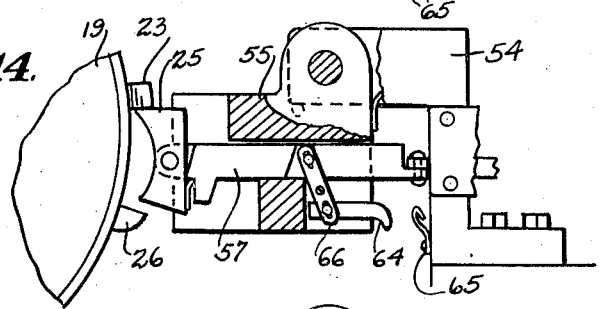
Figure 14 is a similar view showing the detent engaged by the stop.
Figure 15:
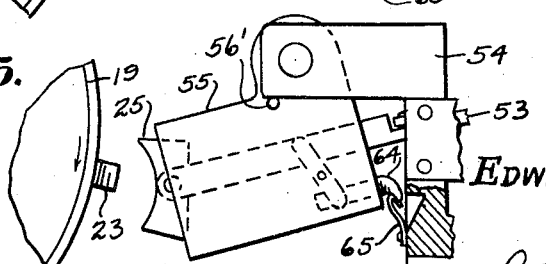
Figure 15 is a similar view showing the parts in the emergency safety position.
Figure 16:
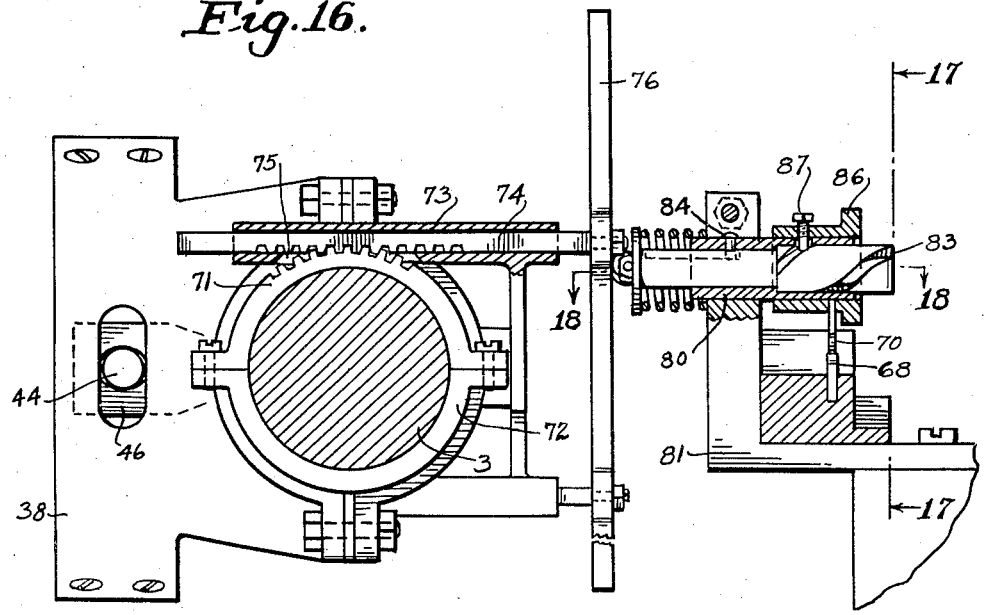
Figure 16 is a sectional view showing the operative train between the propeller blade and the commutator actuating mechanism.
Figure 17:
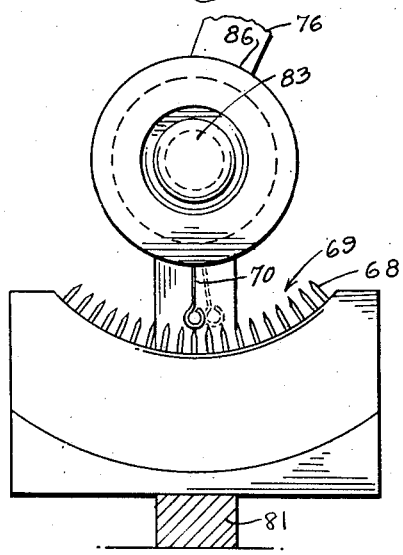
Figure 17 is a front elevation partly in section of the commutator taken along the line 17—17 of Figure 16.
Figure 18:
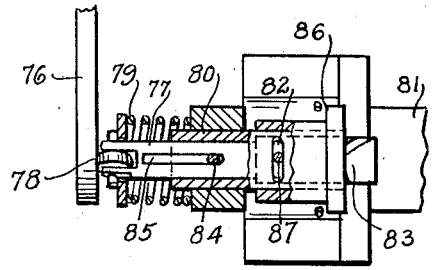
Figure 18 is a section taken along the line 18—18 of Figure 16.

The pilot exercises his manual control of his pitch-angle varying mechanism, guided by a visual indicator 67, probably best shown in Figure 19, and comprising a panel on which are mounted a plurality of electric bulbs or other equivalent indicating media. Each of these lights indicates a very small unit of pitch-angle change for example, one degree of arc. Each light is in an electric circuit including a segment 68 of a commutator 69. The circuit includes a switch arm 70 and when the switch arm is in contact with one of the commutator segments that light on the indicator is illuminated which is in circuit with that particular segment. The switch arm 70 oscillates through an angle including the range occupied by the commutator segments 68, said oscillation being effected directly by the blades of the propeller. The connection is made as follows:

The propeller blades 3 and 4, one being shown in Figure 14 are each provided near its base with an arcuate gear 71. In the present embodiment of the invention, this takes the form of a divided ring 72 clamped around the base of the blade, but it might be formed integral with the blade. A guide 73 is fixedly supported adjacent the blade and through the guide reciprocates a rack bar 74 having teeth meshing with the gear 71, the latter extending into said guide through a slot 75 in the side of the latter member. A ring 76 common to the rack bars of both blades is suitably secured to the ends of said rack bars, lying in a plane perpendicular to the axis of rotation of the propeller. As the pitch of the blades varies in one direction, the ring 76 moves outwardly from the hub. When the direction of the change in the pitch-angle is reversed, the ring moves inwardly toward the hub. This ring in its forward and retrograde movements actuates means for oscillating the switch arm 70, which comprises a plunger 77 preferably provided at its end with an anti-friction roller 78 which bears against said ring at all times through the intermediary of a spring 79. Said plunger extends through a fixed sleeve 80 clampably set up in a bracket 81. Said sleeve is provided with a transverse slot 82, and the underlying portion of the plunger 77 is formed with a spiral channel 83. The plunger is kept from rotating by means of a key 84 fixed in the sleeve 80 and playing in a slot 85 formed in said plunger.

It will be obvious to those skilled in the art that the spiral channel 83 is exposed through the slot 82 and that it shifts laterally in said slot as the plunger is reciprocated. The fixed sleeve 80 is overlain by a free bushing 86 having a pin or screw 87 which extends down through the slot 82 into the spiral channel 83. As the plunger reciprocates, the free bushing oscillates in the same plane, and to the lower portion of said bushing is fixed the switch arm 70.

The switch arm 70 is resilient and of such length that when it contacts with one of the segments 68, it remains in contact with that segment until the pitch-angle has varied through an angle equal to another unit of the indicating device, at which instant the switch arm snaps into contact with the next segment. Thus one of the lights on the indicator panel remains lit throughout the pitch-angle changing operation until the pitch has changed sufficiently to illuminate the next lamp.

In view of the fact that the commutator actuating mechanism is directly connected to the propeller blade, the pitch-angle indication is not affected by any lost motion or any other cause of inaccuracy which may develop in the gear trains which constitute the pitch-angle changing means. Therefore, regardless of how much lost motion may exist in the gear trains, the pilot has before him a true and precise indication of the exact pitch setting and can govern the operation of the hand lever 48 accordingly.

Figure 10:
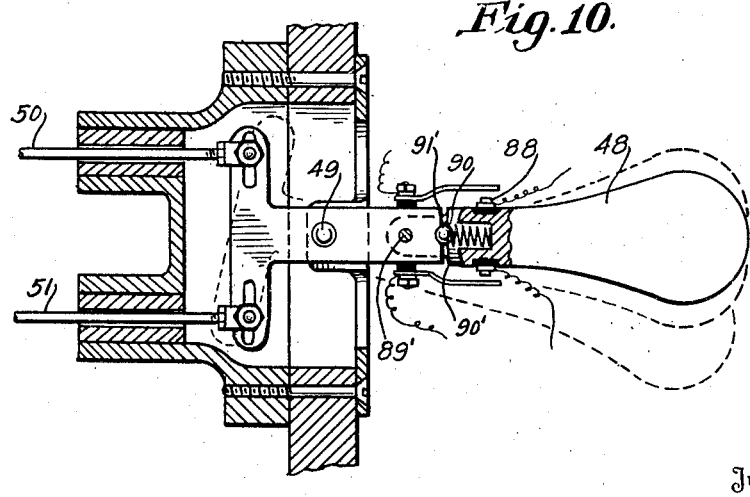
Figure 10 is a horizontal section showing details of the control lever.
Figure 11:
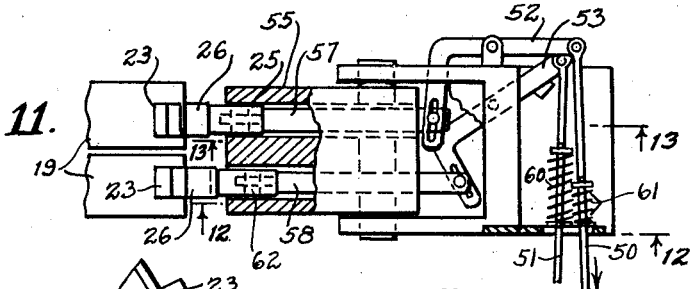
Figure 11 is a plan partly in section showing the selective connections between the fixed and rotatable portions of the control system.

It will be observed from Figure 10 that the hand lever is provided on its side with electrical terminals 88 and 89 out of contact with the hand lever when the latter is in neutral position, but with which said hand lever may be selectively engaged by deflecting it to the right or left through a small arc. The hand lever is preferably divided as shown in Figure 10 the outer part being pivotally connected to the inner part at 89' and having a ball detent 90 for normally maintaining it in neutral position. Abutting shoulders 90' and 91' at the adjacent ends of the parts of the hand lever have a normal slight lost motion, whereby the outer part of the handle can be deflected to one side or the other, but with any further deflection in either direction, the shoulder co-acts and both parts of the handle move as a unit. When the pilot desires to know just what is the present pitch-angle setting, he presses the hand lever slightly to the right or left, just insufficiently to operate the control rods 50 and 51. This action illuminates the lamp or operates other indicating devices corresponding to the present pitch setting. If the pilot wishes to increase or decrease the pitch-angle, he then pushes the hand lever over to its full extent, rocking the inner end thereof and pulling one or the other of the wires 50 or 51 in the manner already described.

Normally, the indicator panel is dark and it is only when the pilot desires to know his pitch-angle setting for changing the same, that the indicating lamps need be illuminated, or other indicating devices operated.

In conclusion, it is apparent that the large forces which must be controlled in varying the pitch-angle of an operating propeller are reduced with this apparatus to forces of an easily handled magnitude, that the control mechanism is equally as simple as the pitch-angle varying gear trains themselves, and that the forces necessary to operate it is no greater than that required to turn the dial of an ordinary radio set.

The fundamental advantages and points of merit of the present invention are therefore, absolute dependability, extreme simplicity, the relative immobility of the parts except when being actuated, the fact that the gears are always in mesh, but not turning except when being actuated, the elimination of the requirement for lubrication, ease of inspection, the fact that the blades are always in locked control and absolutely irreversible except when actuated, ease of pilot control, lightness in weight, and synchronization of movement of the two blades.

It is to be understood that while the above description relates to a thoroughly practical embodiment of the invention, the details of construction as shown and described are not to be considered limitative in their bearing upon the scope of the invention as claimed, but merely by way of example, and that such alterations in the construction of the parts and their relation may be made from time to time according to the exigencies of use without departing from the spirit of the invention.

What I claim is:

1. In aircraft, in combination, a propeller having adjustable pitch blades, and means actuated through the torque of the prime mover for adjusting the pitch of said blades, and means actuated by the propeller blades during the pitch adjusting operation adapted to progressively actuate an indicator, said means being arranged to by-pass any lost motion in the pitch adjusting mechanism.

2. In aircraft, in combination, a propeller having a hub and blades mounted in said hub for pitch adjustment about radial axes, normally inactive pitch adjusting means for said blades carried by said hub, said pitch adjusting means including sets of planetary gearing, one set for each blade, and forward and reverse master gears, each set including a pair of interacting gears meshing respectively with the master gears, a corresponding gear of each pair being an element of a train of reduction gearing operatively connected to said blades for adjusting their pitch, drums associated with said master gears having stops, yielding connections between said drums and master gears, means extraneous to said hub engageable, through pilot control, with said stops, for inhibiting the rotation of one or the other of said master gears for rotating the trains of gearing in one or the other direction and adjusting the pitch of said blades accordingly.

3. In aircraft, in combination, a propeller having pitch adjustable blades, normally inactive means carried by said propeller for adjusting the pitch of said blades, pilot operated means for actuating said pitch adjusting means through the torque of the prime mover, and means actuated by the propeller blades during the pitch adjusting operation adapted to progressively actuate an indicator, said means being arranged to by-pass any lost motion in the pitch adjusting mechanism.

4. In aircraft, in combination, a propeller having adjustable pitch blades, normally inactive pitch adjusting means for said blades carried by said propeller, including levers for oscillating said blades, in the pitch-angle changing operation, screws, one for each blade, and nuts mounted for reciprocation on said screws and connected to said levers for oscillating the same, sets of planetary gearing, one set for each blade, forward and reverse master gears, each of said sets including a pair of interacting gears, meshing respectively with the master gears, a corresponding gear of each pair being an element of a train of reduction gearing operatively connected to said screws for rotating them, drums resiliently connected to said master gears, stops projecting from said drums and means extraneous to said propeller selectively movable into the path of one or the other of said stops for inhibiting the movement of one or the other of said master gears for rotating said trains of gearing in one or the other direction for adjusting the pitch of the blades accordingly.

5. Aircraft, as claimed in claim 4, the inhibiting means comprising manually actuated, normally retracted plungers, tilting detents carried by said plungers having stop engaging portions and cam surfaces, means for the selective actuation of said plungers to bring said detents into the paths of said stops, and lugs on said drums engageable with said cam surfaces for tilting said detents to bring the stop engaging portions thereof beneath said stop.

6. Aircraft, as claimed in claim 4, the inhibiting means comprising manually actuated, normally retracted plungers, tilting detents carried by said plunger having stop engaging portions and cam surfaces, means for selective actuation of said plungers to bring said detents into the paths of said stops, lugs on said drums engageable with said cam surfaces for tilting said detents to bring the stop engaging portions beneath said stops, and a pivoted block carrying said plungers and detents, means normally biasing said block towards said drums, said block being tiltable in opposition to said biasing means by excessive pressure of said stops against said detents.

7. In aircraft, in combination, a propeller having adjustable pitch blades, means actuated through the torque of the prime mover for adjusting the pitch of said blades, means extraneous to said propeller for actuating said pitch adjusting means, and normally non-visible indicating mechanism directly connected to said blades independently of said pitch adjusting means, and means for operating said actuating means and visualizing said indicator.

8. Aircraft, as claimed in claim 7, said operating means in its initial movement, visualizing said indicator before the operation of said actuating means.

9. Pitch-angle varying mechanism for propeller blades comprising a hub in which the blades are mounted for turning about radial axes, normally inactive pitch adjusting means for said blades carried by said hub, said pitch adjusting means including sets of planetary gearing, one set for each blade, and forward and reverse master gears, each set including a pair of interacting gears meshing respectively with the master gears, a corresponding gear of each pair being an element of a train of reduction gearing operatively connected to said blades for turning them, means extraneous to said hub for inhibiting the rotation of one or the other of said master gears for rotating the trains of gearing in one or the other direction and turning said blades accordingly, said trains of reduction gearing each including a compound gear mounted on said hub co-axial with the axis of twist of the blades, having a worm meshing with the portion of said gear train leading to the blade, and a worm wheel thread meshing with the portion of the gear train leading to the planetary gear sets.

10. In aircraft, in combination, a propeller having a hub and blades mounted in said hub for pitch adjustment about radial axes, normal inactive pitch adjusting means for said blades carried by said hub, said pitch adjusting means including sets of planetary gearing, one for each blade, and forward and reverse master gears, each set including a pair of interacting gears meshing respectively with the master gears, a corresponding gear of each pair being an element of a train of reduction gearing operatively connected to said blades for adjusting their pitch, means extraneous to said hub for inhibiting the rotation of one or the other of said master gears for rotating the train of gearing in one or the other direction and adjusting the pitch of the blades accordingly, and means actuated by the propeller blades during the pitch adjusting operation adapted to progressively actuate an indicator, said means being arranged to by-pass any lost motion in the pitch adjusting mechanism.

11. In aircraft, in combination, a propeller having pitch adjusting blades, normally inactive means carried by said propeller for adjusting the pitch of said blades, pilot operated means for actuating said pitch adjusting means through the torque of the prime mover, means actuated by the propeller blades during the pitch adjusting operation adapted to progressively actuate an indicator, said means being arranged to by-pass any lost motion in the pitch adjusting mechanism, means for activating said pitch adjusting means by inducing relative movement in one or the other direction of portions of said means, by the selective stopping of the rotation of other portions of said means, including means projectable into motion inhibiting relation to the portions to be stopped, hand operated means for actuating said projectable means comprising a pivoted handle operable selectively in either direction, connections from said handle to said projectile means, and a switch on each side of said handle adapted to be in circuit with said indicator.

12. In aircraft, in combination, a propeller having pitch adjustable blades, normally inactive means carried by said propeller for adjusting the pitch of said blades, pilot operated means for actuating said pitch adjusting means through the torque of the prime mover, means actuated by the propeller blades during the pitch adjusting operation adapted to progressively actuate an indicator, said means being arranged to by-pass any lost motion in the pitch adjusting mechanism, means for activating said pitch adjusting means by causing relative movement in one or the other direction of portions of said means by selective stopping of the rotation of other portions of said means, including means projectable into motion inhibiting relation to the portions to be stopped, means actuating said projectable means comprising a pivoted handle operable selectively in either direction, connection from said handle to said projectable means, switches at the sides of said handle adapted to be in circuit with the indicator, said switches in the movement of said handle being actuable prior to the actuation of the projectable means.

EDWIN K. LE FEVRE.